United States Patent
Arikere et al.

(10) Patent No.: US 11,926,326 B2
(45) Date of Patent: Mar. 12, 2024

(54) SYSTEM AND A METHOD FOR CONTROLLING WHEEL SLIP OF A VEHICLE

(71) Applicant: VOLVO TRUCK CORPORATION, Gothenburg (SE)

(72) Inventors: Adithya Arikere, Gothenburg (SE); Leo Laine, Härryda (SE); Leon Henderson, Härryda (SE); Sidhant Ray, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 121 days.

(21) Appl. No.: 17/454,165

(22) Filed: Nov. 9, 2021

(65) Prior Publication Data
US 2022/0161801 A1 May 26, 2022

(30) Foreign Application Priority Data
Nov. 25, 2020 (EP) .................... 20209772

(51) Int. Cl.
*B60W 30/18* (2012.01)
*B60W 10/08* (2006.01)
(Continued)

(52) U.S. Cl.
CPC ...... *B60W 30/18172* (2013.01); *B60W 10/08* (2013.01); *B60W 10/18* (2013.01);
(Continued)

(58) Field of Classification Search
CPC .......... B60W 30/18172; B60W 10/08; B60W 10/18; B60W 50/00; B60W 2050/0026;
(Continued)

(56) References Cited

U.S. PATENT DOCUMENTS 11,498,550 B2 * 11/2022 Watanabe .......... B60W 40/068
2016/0046186 A1 2/2016 Gao et al.
(Continued)

FOREIGN PATENT DOCUMENTS

CN 106427662 A 2/2017

OTHER PUBLICATIONS

European Search Report dated May 19, 2021 in corresponding European Patent Application No. 20207991.9, 6 pages.

*Primary Examiner* — Sze-Hon Kong
(74) *Attorney, Agent, or Firm* — Venable LLP; Jeffri A. Kaminski

(57) ABSTRACT

A system and to a method executed in a vehicle control unit for controlling wheel slip of a vehicle, wherein the vehicle comprises at least two wheels driven by at least primary actuator via an open differential. The primary actuator is controlled to rotate at a speed resulting in a slip $\lambda_{em}$ of the primary actuator. A signed wheel slip limit $\lambda_{lim}$ is determined by adding a configurable value to the slip $\lambda_{em}$ of the primary actuator, such that $\lambda_{lim} > \lambda_{em}$. The at least two wheels are controlled to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values.

23 Claims, 5 Drawing Sheets

(51) Int. Cl.
*B60W 10/18* (2012.01)
*B60W 50/00* (2006.01)

(52) U.S. Cl.
CPC ..... *B60W 50/00* (2013.01); *B60W 2050/0026* (2013.01); *B60W 2520/105* (2013.01); *B60W 2520/125* (2013.01); *B60W 2520/266* (2013.01); *B60W 2530/20* (2013.01); *B60W 2720/10* (2013.01); *B60W 2720/12* (2013.01); *B60W 2720/266* (2013.01); *B60W 2720/406* (2013.01)

(58) Field of Classification Search
CPC ..... B60W 2520/105; B60W 2520/125; B60W 2520/266; B60W 2530/20; B60W 2720/10; B60W 2720/12; B60W 2720/266; B60W 2720/406; B60W 10/184; B60W 2300/10; B60W 2300/125; B60W 2300/145; B60W 2300/17; Y02T 10/64; B60L 7/26; B60L 15/2036; B60T 8/17616; B60T 2270/604; B60T 8/175; B60T 8/176; B60T 8/172; B60T 8/32; B60T 13/741; B60Y 2400/81
See application file for complete search history.

(56) References Cited

U.S. PATENT DOCUMENTS

| | | | |
|---|---|---|---|
| 2016/0214486 A1 | 7/2016 | Suzuki | |
| 2019/0152451 A1* | 5/2019 | Nakaoka | B60T 13/662 |
| 2019/0176784 A1* | 6/2019 | Laine | B60T 8/172 |
| 2020/0172063 A1* | 6/2020 | Dieckmann | B60T 8/172 |
| 2020/0198471 A1* | 6/2020 | Brok | B60T 8/17616 |
| 2020/0307532 A1* | 10/2020 | Tsuda | B60T 8/1706 |
| 2021/0078581 A1* | 3/2021 | Velazquez Alcantar | B60L 3/10 |
| 2021/0086736 A1* | 3/2021 | Yao | B60T 1/10 |
| 2021/0155240 A1* | 5/2021 | Hashimoto | B60L 3/108 |
| 2021/0197778 A1* | 7/2021 | Shi | B60T 8/1761 |
| 2022/0041170 A1* | 2/2022 | Nishihashi | B60T 8/3215 |
| 2022/0315004 A1* | 10/2022 | Bensch | B60T 8/17616 |

* cited by examiner

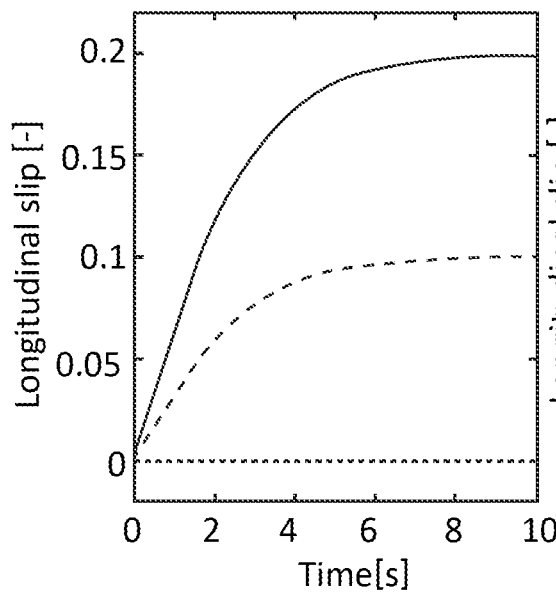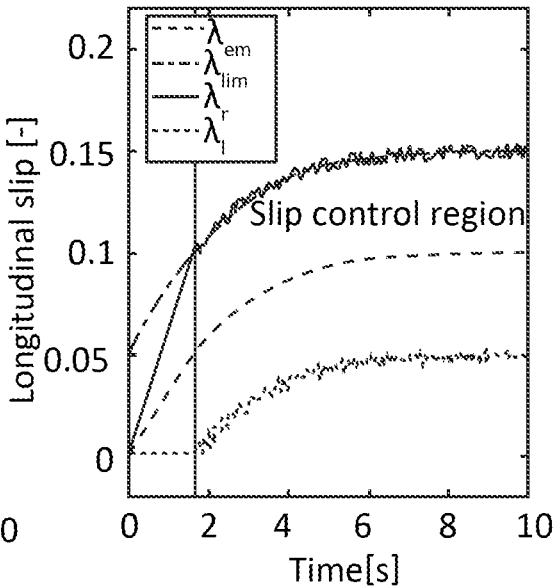
Fig. 3a
Fig. 3b
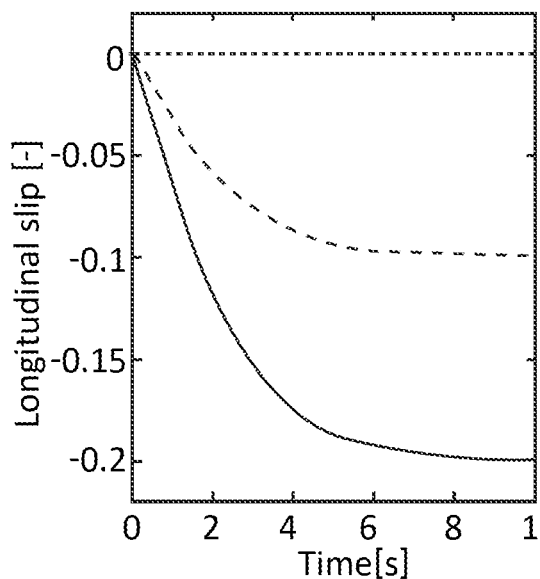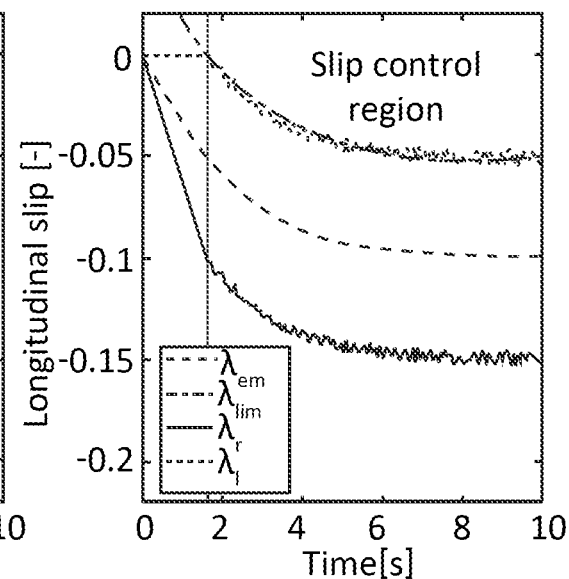
Fig. 4a
Fig. 4b

SYSTEM AND A METHOD FOR CONTROLLING WHEEL SLIP OF A VEHICLE

TECHNICAL FIELD

The present disclosure relates to a system for controlling wheel slip of a vehicle. The disclosure also relates to a method executed in a vehicle control unit for controlling wheel slip of a vehicle. Furthermore, the disclosure relates to a computer program, a computer readable medium and a vehicle control unit. Moreover, the disclosure also relates to a vehicle comprising such a system or such a vehicle control unit.

The invention can be applied in heavy-duty vehicles, such as trucks, buses and construction equipment. Although the invention will be described with respect to cargo transport vehicles such as semi-trailer vehicles and trucks, the invention is not restricted to this particular vehicle, but may also be used in other vehicles such as cars.

BACKGROUND

The braking system of a heavy duty vehicle is key to safe vehicle operation. The braking system not only limits vehicle velocity when needed, but also plays an important role in maintaining vehicle stability. For instance, if a left wheel of the vehicle runs over an icy area of the road, resulting in reduced friction and grip, while the corresponding right wheel runs on a non-slippery part of the road, then the braking system can be activated to compensate for and counteract the arisen slip situation.

A common approach for requesting a certain tyre force is to use torque control at the actuator level. However, such an approach has significant performance limitations. If a safety critical or excessive slip situation arises, then a relevant safety function (traction control, anti-lock brakes, etc.) steps in and requests a torque override in order to bring the slip back into control. A problem with this is that since the primary control of the actuator and the slip control are allocated to two different controllers, the latencies involved in the communication between them significantly limits the slip control performance.

A solution to the above approach may be to use a tyre model for converting a torque request into a wheel slip request. Thus, rather than to strive for a certain tyre force controlled at the actuator level, a faster control response may be obtainable by instead controlling the wheel slip, i.e. the rotational speed of the wheel. However, when left and right wheels are driven by an electric machine via an open differential, the coordination of slip limits or targets across actuators is challenging during split friction scenarios (sometimes also referred to as split-mu scenarios). Lack of appropriate choice of slip limits for the actuators can lead to loss of traction and/or actuators "fighting" each other.

Thus, it would be desirable to provide an improved wheel slip control for vehicles comprising left and right wheels driven by an electric machine via an open differential.

SUMMARY

An object of the invention is to provide a system which alleviates the drawbacks of the prior art. This and other objects, which will become apparent in the following disclosure, are achieved by a system as defined in the accompanying independent claim 1.

The present inventive concept is based on the realization that by setting a signed wheel slip limit, and by activating an actuator (such as a service brake) when the wheel slip for a wheel on one side of the vehicle exceeds the signed wheel slip limit, torque may effectively be transferred to the wheel on the other side of the vehicle. In this way, the risk of actuators fighting each other may be efficiently reduced. Different aspects and exemplary embodiments will be discussed in the following.

According to a first aspect of the present disclosure, there is provided a system for controlling wheel slip of a vehicle, wherein the vehicle comprises at least two wheels driven by at least one primary actuator (such as an electric machine) via an open differential, and individual secondary actuators (such as service brakes) for providing additional force (such as friction force) to the individual wheels, respectively, the system comprising a vehicle control unit, VCU, and a motion support device, MSD, wherein the VCU is configured to:
  request the primary actuator to rotate at a speed resulting in a slip $\lambda_{em}$ of the primary actuator,
  determine a signed wheel slip limit $\lambda_{lim}$ by adding a configurable value to the slip $\lambda_{em}$ of the primary actuator, such that $\lambda_{lim} > \lambda_{em}$, and
  send a control signal to the motion support device, MSD, for controlling said at least two wheels of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values, wherein the MSD, is configured to:
  receive said control signal from the VCU,
  calculate a current respective wheel slip $\lambda_l$, $\lambda_r$ of each one of said at least two wheels or a current respective rotational speed which is transformable into said respective wheel slip $\lambda_l$, $\lambda_r$, and
  based on the received control signal, when one of the current respective wheel slips $\lambda_l$, $\lambda_r$ exceeds the signed wheel slip limit $\lambda_{lim}$, then the MSD is configured to activate the respective secondary actuator to the wheel having the exceeding wheel slip in order to transfer torque to the other wheel(s).

Said at least two wheels may, for instance, be a left wheel and a right wheel driven by a primary actuator via an open differential. Therefore, for simplicity, the wheel slips discussed in this disclosure have been denoted $\lambda_l$ and $\lambda_r$, where the subscripts "l" and "r" have been chosen because of their easily understandable reference to "left" and "right". However, it should be understood that the present invention is not limited to left and right wheels specifically. The general inventive concept may also be implemented in embodiments where multiple axles or all wheels are driven through open differentials. For instance, the general inventive concept may suitably be used in an all-wheel drive vehicle, where all wheels are driven through open differentials. The signed wheel slip limit $\lambda_{lim}$ will thus be relevant to all wheels instead of only two wheels. Another example embodiment is a multiple axle drive where the first and second drive axle have their inter-wheel differentials locked (left and right wheels have the same speed in each axle), but the inter-axle differential is unlocked (first and second drive axle average speed does not need to be the same). The general inventive concept may be implemented also for such an example embodiment, wherein the signed wheel slip limit $\lambda_{lim}$ is sent to all wheels of the two drive axles.

Thus, it should be understood that although, for the sake of clarity, the discussions in this disclosure is focussed on two wheels and only two lambdas are symbolically $\lambda_l$ and $\lambda_r$ included in the text of this disclosure, the general inventive concept is applicable to two or more wheels, wherein the MSD may be configured to control the wheel slip of each such wheel.

It should also be understood that although the primary actuator may suitably be an electric machine such as an electric motor in an electrically driven vehicle (and therefore the subscript "em" has been used for the slip $\lambda_{em}$ of the primary actuator), other primary actuators are also conceivable. For instance, the primary actuator may be an internal combustion engine, such as a diesel engine, or a retarder.

The secondary actuators may suitable be service brakes, each one associated with a respective one of said at least two wheels, for providing friction force to the wheels. However, the secondary actuators may be any other suitable actuator that may be activated so as to transfer torque from the wheel having the exceeding wheel slip to the other wheel or wheels.

From the above discussions it should now be clear that various exemplary embodiments are conceivable, one of which may for instance be as follows. According to at least one exemplary embodiment, there is provided a system for controlling wheel slip of a vehicle, wherein the vehicle comprises left and right wheels driven by at least one electric machine via an open differential, and left and right service brakes for providing friction force to the left and right wheels, respectively, the system comprising a vehicle control unit, VCU, and a motion support device, MSD,
wherein the VCU is configured to:
request the electric machine to rotate at a machine speed resulting in a slip $\lambda_{em}$ of the electric machine,
determine a signed wheel slip limit $\lambda_{lim}$ by adding a configurable value to the slip $\lambda_{em}$ of the electric machine, such that $\lambda_{lim} > \lambda_{em}$, and
send a control signal to the motion support device, MSD, for controlling the left wheel and the right wheel of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values,
wherein the MSD, is configured to:
receive said control signal from the VCU,
calculate a current wheel slip $\lambda_l$ of the left wheel and a current wheel slip $\lambda_r$ of the right wheel or a current respective rotational speed which is transformable into wheel slips $\lambda_l$, $\lambda_r$, and
based on the received control signal, when one of the current wheel slip $\lambda_l$ of the left wheel and the current wheel slip $\lambda_r$ of the right wheel exceeds the signed wheel slip limit $\lambda_{lim}$, then the MSD is configured to activate the respective service brake to the wheel having the exceeding wheel slip in order to transfer torque to the other wheel.

In the following, for convenience, the discussion will mainly focus on the primary actuator being an electric machine, the secondary actuators being service brakes, and the at least two wheels being a left and a right wheel. However, in view of the above explanations, it will be understood that the discussed embodiments and features are readily implementable for other constellations of primary actuator, secondary actuators and at least two wheels driven by the primary actuator.

For a vehicle having n number of wheels driven by a primary actuator, such as an electric machine, via an open differential, the wheel slips will be such that their average equals the slip $\lambda_{em}$ of the primary actuator.

$$\lambda_{em} = \frac{\lambda_1 + \lambda_2 + \ldots + \lambda_n}{n}$$

Thus, for a vehicle having left and right wheels driven by a primary actuator, such as an electric machine, via an open differential, the wheel slips $\lambda_l$ and $\lambda_r$ will be such that their average equals the slip $\lambda_{em}$ of the electric machine:

$$\lambda_{em} = \frac{\lambda_l + \lambda_r}{2}$$

Thus, each individual wheel slip $\lambda_l$ and $\lambda_r$ may be equal to the slip $\lambda_{em}$ of the electric machine, or one of the wheel slips (e.g. $\lambda_l$) may be higher while the other one (e.g. $\lambda_r$) may be lower than $\lambda_{em}$. As long as the wheel slips $\lambda_l$ and $\lambda_r$ only deviate from the slip $\lambda_{em}$ of the electric machine within an allowed range, the MSD does not need to interfere in any correcting action. However, when the deviation is outside the allowed range, i.e. when one of the wheel slips exceeds the signed wheel slip limit $\lambda_{lim}$, then the MSD will take corrective action in order transfer torque to the other wheel. Thus, the wheel on the low friction side will be subjected to the action of the service brake in order to transfer torque to the wheel on the high friction side. Hereby, an efficient slip control is achieved for wheels driven via an open differential and the risk of loss of traction and/or actuators (such as brake actuators) "fighting" each other may be reduced.

According to at least one exemplary embodiment, the configurable value is a threshold value $\lambda_{thr}$ chosen as $0 < \lambda_{thr} < \lambda_{em}$. The lower limit ensures that the wheel slip of a wheel is greater than $\lambda_{em}$ before slip control is started using the associated service brake. This ensures that the associated service brake does not interfere when slip control is being performed by the electric machine alone. The upper limit ensures that the wheel slip of a wheel is lower than $2\lambda_{em}$ which is the worst case scenario when no traction is available for one of the wheels (i.e. on the low friction side).

From the above, it may be understood, that a simple way to define the signed wheel slip limit $\lambda_{lim}$ is $\lambda_{lim} = \lambda_{em} + \lambda_{thr}$, where $\lambda_{thr}$ is a defined threshold value chosen as $0 < \lambda_{thr} < \lambda_{em}$. Other ways will be touched upon further down in this disclosure.

According to at least one exemplary embodiment, the threshold value $\lambda_{thr}$ is a fixed value. This provides for a simple way to set the signed wheel slip limit $\lambda_{lim}$. The fixed value may, for instance, be empirically determined by tests for the particular vehicle and tyres. For instance, the fixed value may be set somewhere in the range of 0.02-0.08, such as in the range of 0.03-0.07, for example 0.04-0.06. According to at least one exemplary embodiment the threshold value $\lambda_{thr}$ value may be 0.05.

According to at least one exemplary embodiment, the VCU is configured to dynamically configure the configurable value, suitably based on the current state of one or more vehicle driving parameters, such as current speed of the vehicle. This is advantageous as the slip control may become more critical at higher speeds of the vehicle. For instance, the configurable value may be set to a lower value at higher speeds of the vehicle (i.e. smaller allowable deviation of the wheel slips $\lambda_l$, $\lambda_r$ compared the slip $\lambda_{em}$ of the electric machine), and conversely the configurable value may be set to a higher value at lower speeds of the vehicle (i.e. larger allowable deviations). In other words, since the configurable value may be dynamically configured, the signed wheel slip limit $\lambda_{lim}$ (obtained by adding the configurable value to the slip $\lambda_{em}$ of the electric machine) may also be dynamically configurable.

According to at least one exemplary embodiment, the configurable value is obtained from a function of the slip $\lambda_{em}$ of the primary actuator. Thus, in the case of the primary actuator being an electric machine, the configurable value is obtained from a function of the slip $\lambda_{em}$ of the electric machine. This is advantageous as it provides for various different configuration alternatives. For instance, the configurable value may be set as k+x $\lambda_{em}{}^y$, where k, x and y, may be provided with different numbers depending on the how one wishes to configure the configurable value relative to the slip $\lambda_{em}$ of the electric machine. In some exemplary embodiments the signed wheel slip limit $\lambda_{lim}$ may be a monotonically increasing function of the slip $\lambda_{em}$ of the electric machine.

According to at least one exemplary embodiment the configurable value is obtained from a look-up table using the slip $\lambda_{em}$ of primary actuator as index. Thus, according to at least one exemplary embodiment the configurable value is obtained from a look-up table using the slip $\lambda_{em}$ of the electric machine. This also provides a simple way for setting the configurable value, and also numerous different configuration alternatives. For instance, in some exemplary embodiments the configurable value may be such that the resulting signed wheel slip limit $\lambda_{lim}$ is a stepwise changing function.

As understood from the previous discussion, according to at least one exemplary embodiment, when the vehicle is accelerating or decelerating, the VCU is configured to control the at least two wheels (such as said left wheel and right wheel) to rotate at wheel speeds resulting in respective wheel slips $\lambda_l$, $\lambda_r$ which are equal to or larger than zero, but smaller than $2\lambda_{em}$. In particular, according to at least one exemplary embodiment, when the vehicle is accelerating, the maximum positive wheel slip for a wheel may be chosen to be larger than $\lambda_{em}$ but smaller than $2\lambda_{em}$. Choice of fixed slip limits that satisfy this condition automatically result in a system that works well for propulsion in split-mu scenarios.

Another input to calculation of a suitable threshold value $\lambda_r$m may be the steering angle of the vehicle and/or lateral acceleration and/or yaw rate. When the vehicle is in a turn it can be expected that one wheel on the axle will spin faster than the other. The threshold value $\lambda_{thr}$ may suitably be set to be above this realistically possible "nominal" speed difference. While turning, $\lambda_{thr}$ may be reduced to ensure that the tyres do not saturate due to too much longitudinal slip and therefore retain adequate lateral capability for cornering. According to at least one exemplary embodiment, the VCU is configured to request the electric machine (primary actuator) to rotate at a rotational machine speed $\omega_{em}$ resulting in a slip $\lambda_{em}$ of the electric machine based on the equation $$\lambda_{em} = \frac{\omega_{em} i_g i_{fd} R - v_x}{\max(|\omega_{em} i_g i_{fd} R|, |v_x|)}$$

where $i_g$ is a gear ratio, $i_{fd}$ is a final drive ratio, R is the wheel radius, $v_x$ is the vehicle velocity (in the coordinate system of the wheel).

Thus, $\lambda_{em}$ is bounded between −1 and 1 and quantifies how much the electric machine is slipping with respect to the road surface. In other words, $\lambda_{em}$ quantifies how much each wheel is slipping with respect to the road surface if the wheel slips $\lambda_l$, $\lambda_r$ are equally distributed (for instance, if the left and the right wheel both run on a dry road surface, and the tyres are substantially evenly loaded and in substantially even condition). Thus, in the case of $\lambda_l=\lambda_{em}$, then $\lambda_{em}$ quantifies how much each wheel is slipping with respect to the road surface. Therefore, when the VCU requests the electric machine to rotate at a machine speed $\omega_{em}$ resulting in a slip $\lambda_{em}$ of the electric machine, it may be regarded as an indirect request for a desired wheel slip. However, according to the present disclosure, the actual wheel slips may deviate to some extent from said desired wheel slip, but the allowable deviation is limited, i.e. limited to the signed wheel slip limit $\lambda_{lim}$. Thus, by combining the request for a machine speed in combination with setting a maximum allowable deviation of the wheel slip, a good wheel slip control is achievable also for wheels driven by an electric machine via an open differential. The VCU may suitably maintain up-to-date information on $v_x$, while a speed sensor or the like may be used to determine $\omega_{em}$.

It should be noted that the wheel slip limit $\lambda_{lim}$ is a signed wheel slip limit, not an absolute limit. Thus, when the signed wheel slip limit $\lambda_{lim}$ is applied during propulsion, the signed wheel slip limit $\lambda_{lim}$ sets a maximum allowable positive slip. During braking, however, the signed wheel slip limit $\lambda_{lim}$ sets a minimum allowable negative slip. It should be understood that the slip limits for propulsion and braking (positive and negative slip) may be sent separately to the MSD, i.e. the same slip limit signal does not need to be used for both propulsion and braking. In other exemplary embodiments, however, the same slip limit signal may be used for both propulsion and braking.

Although the present disclosure relates to a system for controlling wheel slip, and the VCU of the system sends a control signal to the motion support device, MSD, for controlling said at least two wheels of the vehicle to rotate at wheel speeds resulting in respective wheel slips $\lambda_l$, $\lambda_r$ below the signed wheel slip limit $\lambda_{lim}$, the actual control signal does not necessarily need to include slip limit value(s). The VCU may, for instance, be configured to recalculate the slip limit $\lambda_{lim}$ into a speed limit $\omega_{lim}$, and thus the control signal may instead include speed value(s). The MSD may calculate the rotational speed of the respective wheels, said rotational speeds being transformable into wheel slips, by using the slip formula:

$$\lambda = \frac{R\omega - v_x}{\max(|R\omega|, |v_x|)}$$

where $\lambda$ is the longitudinal wheel slip, where $R_{107}$ is the rotational speed of the wheel, of which R is the wheel radius in meters and $\omega$ is the angular velocity of the wheel, and where $v_x$, is the longitudinal speed of the wheel (in the coordinate system of the wheel). Thus, the end result will be the same, the control signal controls the wheels to rotate at wheel speeds resulting in respective wheel slips $\lambda_l$, $\lambda_r$ below the signed wheel slip limit $\lambda_{lim}$, irrespective of if the control signal from the VCU includes slip value(s) or speed value(s), and thus irrespective of if the MSD calculates current wheel slip or current rotational speed, respectively.

In other exemplary embodiments the control signal may include a speed offset (where speed offset=actuator speed−$v_x$). The speed offset may actually be a function of any number of parameters, such as $\lambda_{thr}$, steering angle, yaw rate, lateral acceleration, vehicle speed, etc.

According to a second aspect of the present disclosure, there is provided a method executed in a vehicle control unit, VCU, for controlling wheel slip of a vehicle, wherein the vehicle comprises at least two (such as left and right) wheels driven by at least one primary actuator (such as an electric machine) via an open differential, the method comprising:

requesting the primary actuator to rotate at a speed resulting in a slip $\lambda_{em}$ of the primary actuator, determining a signed wheel slip limit $\lambda_{lim}$ by adding a configurable value to the slip $\lambda_{em}$ of the primary actuator, such that $\lambda_{lim} > \lambda_{em}$, and controlling said at least two wheels of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values.

The advantages of the various embodiments of the second aspect are largely analogous to the advantages of the previously discussed corresponding embodiments of the first aspect. Exemplary embodiments of the method of the second aspect include the following.

According to at least one exemplary embodiment, the configurable value is a threshold value $\lambda_{thr}$ chosen as $0 < \lambda_{thr} < \lambda_{em}$.

According to at least one exemplary embodiment, the threshold value $\lambda_{thr}$ is a fixed value.

According to at least one exemplary embodiment, the method comprises dynamically configuring the configurable value, suitably based on the current state of one or more vehicle driving parameters, such as current speed of the vehicle.

According to at least one exemplary embodiment, the configurable value is obtained from a function of the slip $\lambda_{em}$ of the primary actuator.

According to at least one exemplary embodiment, the configurable value is obtained from a look-up table using the slip $\lambda_{em}$ of the primary actuator as index.

According to at least one exemplary embodiment, the signed wheel slip limit $\lambda_{lim} = \lambda_{em} + \lambda_{thr}$, where $\lambda_{thr}$ is a defined threshold value chosen as $0 < \lambda_{thr} < \lambda_{em}$.

According to at least one exemplary embodiment, the method further comprises controlling, when the vehicle is accelerating or decelerating, the at least two wheels to rotate at wheel speeds resulting in respective wheel slips $\lambda_l$, $\lambda_r$ which are equal to or larger than zero, but smaller than $2\lambda_{em}$.

According to at least one exemplary embodiment, when the vehicle is accelerating, the maximum positive wheel slip for a wheel may be chosen to be larger than $\lambda_{em}$ but smaller than $2\lambda_{em}$.

According to at least one exemplary embodiment, the method, further comprises controlling the primary actuator to rotate at a rotational speed $\omega_{em}$ resulting in a slip $\lambda_{em}$ of the primary actuator based the equation $$\lambda_{em} = \frac{\omega_{em} i_g i_{fd} R - v_x}{\max(|\omega_{em} i_g i_{fd} R|, |v_x|)}$$

where $i_g$ is a gear ratio, $i_{fd}$ is a final drive ratio, R is the wheel radius, $v_x$ is the vehicle velocity.

According to a third aspect of the present disclosure, there is provided a computer program comprising program code means for performing method according to the second aspect, including any embodiments thereof, when said program is run on a computer or on processing circuitry of a vehicle control unit, VCU. The advantages of the computer program of the third aspect largely correspond to those of the other aspects, including any embodiments thereof.

According to a fourth aspect of the present disclosure, there is provided a computer readable medium carrying a computer program comprising program code means for performing method according to the second aspect, including any embodiments thereof, when said program product is run on a computer or on processing circuitry of a vehicle control unit, VCU. The advantages of the computer readable medium of the fourth aspect largely correspond to the advantages of the other aspects, including any embodiments thereof.

According to a fifth aspect of the present disclosure, there is provided a vehicle control unit, VCU, for controlling wheel slip of a vehicle, the control unit being configured to perform the method according to the second aspect, including any embodiments thereof. The advantages of the VCU of the fifth aspect largely correspond to the advantages of the other aspects, including any embodiments thereof.

The VCU may include a microprocessor, microcontroller, programmable digital signal processor or another programmable device. The VCU may also, or instead, include an application specific integrated circuit, a programmable gate array or programmable array logic, a programmable logic device, or a digital signal processor. Where the VCU includes a programmable device such as the microprocessor, microcontroller or programmable digital signal processor mentioned above, the processor may further include computer executable code that controls operation of the programmable device.

According to a sixth aspect of the present disclosure, there is provided a vehicle comprising a system according to the first aspect, including any embodiments thereof, or a vehicle control unit, VCU, according to the fifth aspect, including any embodiments thereof. The advantages of the vehicle of the sixth aspect largely correspond to the advantages of the other aspects, including any embodiments thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIGS. 3a and 3b are graphs which schematically illustrate, for a propulsion scenario, the difference in slip when no slip control is performed compared to when split control is performed in accordance with the present disclosure.

FIGS. 4a and 4b are graphs which schematically illustrate, for a braking scenario, the difference in slip when no slip control is performed compared to when split control is performed in accordance with the present disclosure.

DETAILED DESCRIPTION OF EXAMPLE EMBODIMENTS OF THE INVENTION

Figure 1:
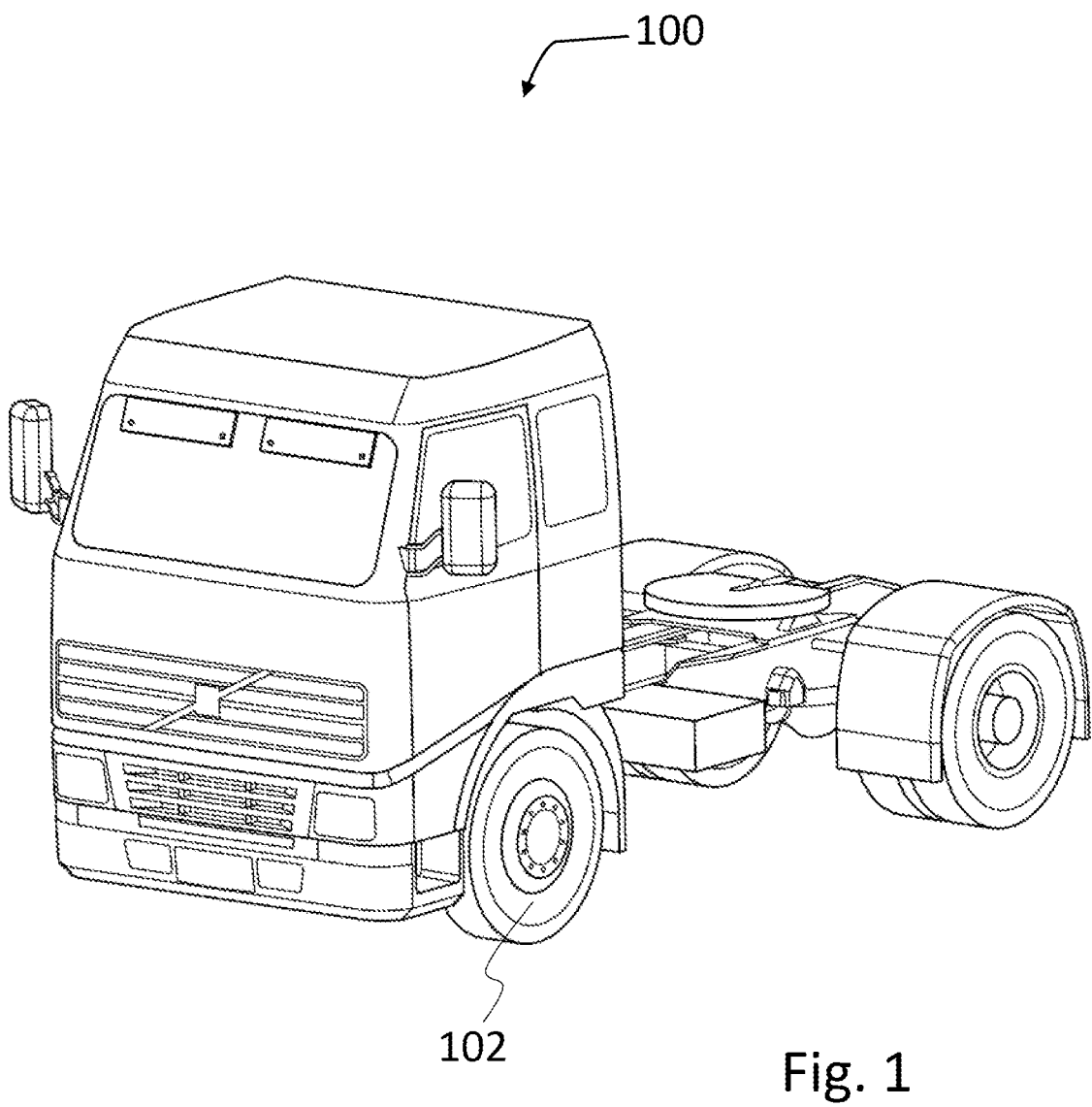
FIG. 1 illustrates a vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 100 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars.

The illustrated vehicle 100 is supported on wheels 102, some of which are driven wheels. Although the vehicle 100 in FIG. 1 only has four wheels 102, the inventive concept is applicable to vehicles having more wheels, such as in the above-mentioned different types of vehicles.

Each wheel 102, or at least a majority of the wheels, is associated with a respective wheel brake, a service brake. This wheel brake may, e.g. be a pneumatically actuated disc brake or drum brake, but most aspects of the disclosure are also applicable to regenerative brakes which produce electrical power during vehicle retardation, and electrical machines able to slow down wheel rotational velocity upon request. The wheel brakes are controlled by a motion support device (MSD), which may control applied braking force on at least one wheel 102 of a vehicle such as the vehicle 100 in FIG. 1. Each MSD is communicatively coupled to a control unit (not shown in FIG. 1), allowing the control unit to communicate with the MSD and thereby control vehicle braking. This control unit may potentially comprise a number of sub-units distributed across the vehicle 100, or it may be a single physical unit. The control unit may e.g. allocate brake force between wheels to maintain vehicle stability.

Each driven wheel 102 may be driven by a suitable electrical machine (such as an electrical motor, a combined motor/generator, etc.) The electrical machine may drive more than one wheel, e.g. working across an open differential. According to the present disclosure, at least one pair of wheels (for instance, left and right wheels) is driven by at least one primary actuator via an open differential, and individual secondary actuators are configured to provide additional force to said wheels. In the following discussion, as a purely illustrative example, the primary actuator is in the form of an electric machine, the secondary actuators are in the form of service brakes configured to provide friction force to the respective wheels. It should however, be noted that a different primary actuator, such as a diesel engine or a retarder, may be used in the corresponding way as an electric machine, and other secondary actuators, such as other local braking devices may be used instead of service brakes. Furthermore, the invention may be implemented on more than the two wheels exemplified below.

In some exemplary embodiments, other driven wheels of the vehicle 100 may be propelled by an individually associated electrical machine. In either case, the above-mentioned control unit may suitably be communicatively coupled to such electrical machines for allocating the propulsion force between wheels. A more detailed discussion of the above-discussed a control unit will now follow in connection to the presentation of FIG. 2.

Figure 2:
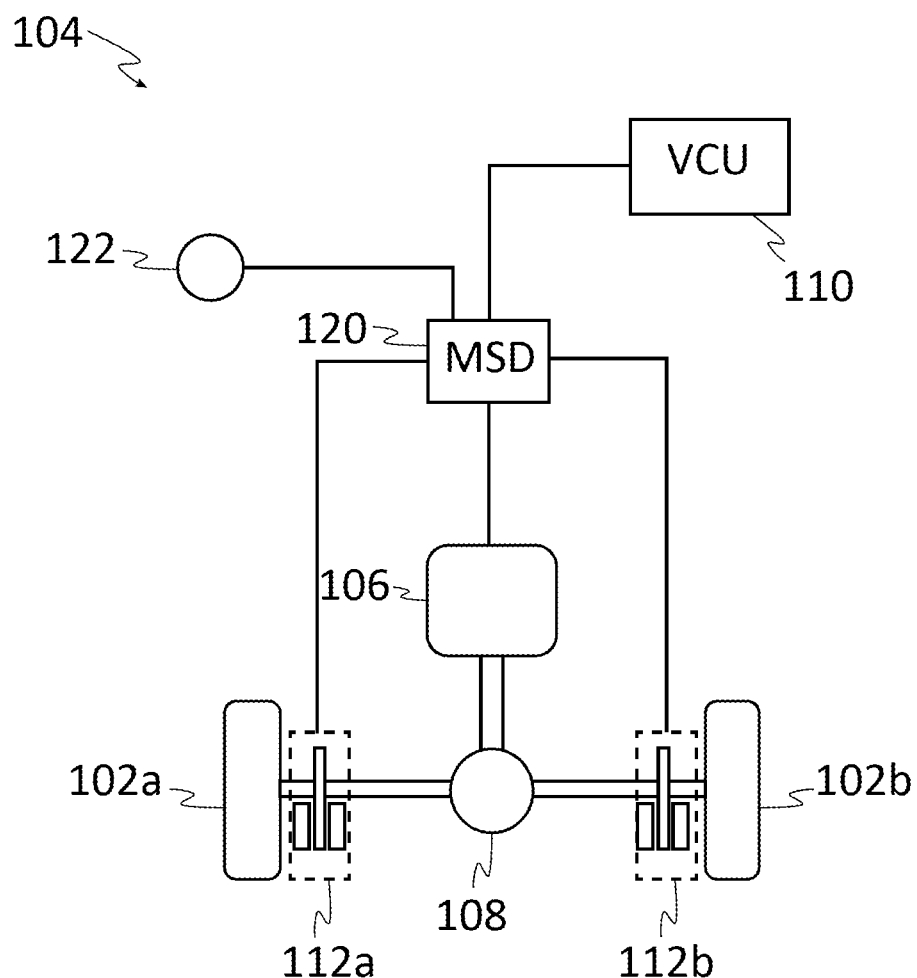
FIG. 2 illustrates a system for controlling wheel slip of a vehicle, in accordance with at least one exemplary embodiment of the invention.

FIG. 2 illustrates a system 104 for controlling wheel slip of a vehicle, in accordance with at least one exemplary embodiment of the invention. As illustrated, the vehicle comprises a left wheel 102a and a right wheel 102b which are driven by at least one electric machine 106 via an open differential 108. Left and right service brakes 112a, 112b are installed for providing friction force to the left and right wheels 102a, 102b, respectively. The service brakes 112a, 112b are here illustrated as disc brakes, however, other types are conceivable, as previously mentioned. For instance, the brake system may also comprise one or more additional electrical machines, and/or combinations of different brake actuators.

The system comprises a motion support device (MSD) 120 which is arranged to control the wheel braking by activating one or both service brakes 112a, 112b. The same, or a different, MSD may be configured to control the operation of the electric machine 106. The system 104 also comprises a vehicle control unit (VCU) 110, e.g. a vehicle motion management system. The MSD 120 is communicatively coupled to the VCU 110. Although the MSD 120 and the VCU 110 have been illustrated as two functionally separate entities, it should be understood that they may be structurally provided as one common entity. Thus, in some exemplary embodiments, the MSD 120 and the VCU 110 are provided as one unit. In other exemplary embodiments, the MSD 120 and the VCU 110 may be structurally separated. In some exemplary embodiments there may be individual separate MSDs for each actuator (i.e. one for the electric machine 106, another one for the left service brake 112a, and yet another one for the right service brake 112b; or one for the electric machine 106 and a common one for left and right service brakes 112a, 112b). It should also be understood that the VCU 110 may be distributed over several structural entities, some of which may be remote from the vehicle, e.g. off-board. For instance, some functionalities, such as calculations made by the VCU 110 may be cloud-based, wherein part of the VCU 110 may be provided at one or more remote servers, etc.

The VCU 110 is configured to request the electric machine 106 to rotate at a machine speed resulting in a slip $\lambda_{em}$ of the electric machine 106. The request may suitably be sent form the VCU 110 to the MSD 120. The request to have the electric machine 106 rotate at a certain machine speed may be regarded as an indirect request for a certain rotational speed of the wheels 102a, 102b. Put differently, the desired slip $\lambda_{em}$ of the electric machine 106 resulting from said certain machine speed, may be regarded as an indirect request for a certain desired wheel slip. However, the left and right wheels 102a, 102b, being driven by the electric machine 106 via the open differential 108, may not necessarily obtain the desired wheel slip. Under perfect conditions, each one of the left and the right wheels 102a, 102b may indeed get a wheel slip $\lambda_l$ and $\lambda_r$, respectively, which is equal to the slip $\lambda_{em}$ of the electric machine 106. However, in practice, the conditions will oftentimes be such that one of the wheel slips $\lambda_l$ and $\lambda_r$ will have a higher value than the slip $\lambda_{em}$ of the electric machine 106, while the other one will have a lower value. This may, for instance, be the case when the tyre of one of the wheels runs over an area of the road that has different properties (e.g. wetter, more slippery, etc.) compared to an area on which the tyre of the other wheel runs. Thus, the friction between the wheels and the road surface may therefore differ and consequently the wheel slips $\lambda_l$ and $\lambda_r$ may also differ from one another, and thus also from the value of the slip $\lambda_{em}$ of the electric machine 106. By following the teaching of the present disclosure, excessive deviation from said value may be prevented, or at least counteracted.

More specifically, the VCU 110 is configured to determine a signed wheel slip limit $\lambda_{lim}$ by adding a configurable value to the slip $\lambda_{em}$ of the electric machine 106, such that $\lambda_{lim} > \lambda_{em}$. It should indeed be pointed out that the wheel slip limit $\lambda_{lim}$ is a signed value. Thus, for a positive slip (propulsion scenario), i.e. slip values are above zero, the wheel slip limit $\lambda_{lim}$ will have a higher positive value (i.e. farther from zero) compared to the slip $\lambda_{em}$ of the electric machine 106. However, for a negative slip (braking scenario), i.e. the slip values are below zero, the wheel slip limit $\lambda_{lim}$ will have a lower negative value (i.e. closer to zero) compared to the slip $\lambda_{em}$ of the electric machine 106.

The VCU 110 is configured to send a control signal to the MSD 120, for controlling the left wheel 102a and the right wheel 102b of the vehicle to rotate at wheel speeds resulting in respective wheel slips $\lambda_l$, $\lambda_r$ below the signed wheel slip limit $\lambda_{lim}$. Each one of $\lambda_l$, $\lambda_r$ and $\lambda_{em}$ are signed numerical values. Thus, the signed wheel slip limit $\lambda_{lim}$ sets a maximum allowable wheel slip for either one of the left wheel 102a and the right wheel 102b.

In this disclosure, when discussing wheel slip, it is intended to refer to longitudinal wheel slip. In this connection, it should be noted that longitudinal refers to a radial direction of the wheel in question, specifically the radial direction which is parallel to the road surface and along which the wheel is heading under normal conditions. The (longitudinal) wheel slip, $\lambda$, for a wheel (i.e. $\lambda_l$ for the left wheel 102a or $\lambda_r$ for the right wheel 102b) is unitless, and may be expressed as:

$$\lambda = \frac{R\omega - v_x}{\max(|R\omega|, |v_x|)}$$

where R is the wheel radius in meters, $\omega$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. During braking, $v_x > R\omega$, and thus the wheel slip is negative. During acceleration, $v_x < R\omega$, and thus the wheel slip is positive. The VCU 110 may maintain/obtain information on $v_x$, (in the reference frame of the wheel), while a wheel speed sensor may be used to determine $\omega$. FIG. 2 schematically illustrates that the system 104 may include or be operatively connected to such wheel speed sensors 122. The wheel speed sensors 122 may for instance be Hall-effect sensors or other type of wheel speed sensors. The measured rotational speed may be transmitted from the wheel speed sensors 122 to the MSD 120, by wireline or wireless communication link. The velocity of the vehicle may be measured by another sensor (not illustrated), such as a radar sensor, a lidar sensor, or a global positioning system (GPS) receiver, the measured velocity being obtainable by the VCU 110 and/or the MSD 120. The velocity of the vehicle may also be calculated based on wheel speeds from other axles on the vehicle that are not driven. Although the above equation is a commonly used for determining wheel slip, other definitions may also be used. For instance, as mentioned previously in this disclosure, speed offset may be another option.

Thus, when the MSD 120 has received the control signal from the VCU 110, it will calculate a current wheel slip $\lambda_l$ of the left wheel 102a and a current wheel slip $\lambda_r$ of the right wheel 102b, for instance by the means of the above mentioned equation and by means of input from the wheel speed sensors 122. Based on the received control signal, when one of the current wheel slip $\lambda_l$ of the left wheel 102a and the current wheel slip $\lambda_r$ of the right wheel 102b exceeds the signed wheel slip limit $\lambda_{lim}$, then the MSD 120 is configured to activate the respective service brake 112a, 112b to the wheel having the exceeding wheel slip in order to transfer torque to the other wheel. In this way, the wheel slips will substantially be kept within the allowable range, i.e. the wheel slips will be controlled to return to an allowable value if the limit is exceeded.

As mentioned above, the VCU 110 is configured to determine the signed wheel slip limit $\lambda_{lim}$ by adding a configurable value to the slip $\lambda_{em}$ of the electric machine 106, such that $\lambda_{lim} > \lambda_{em}$. The configurable value has a threshold value $\lambda_{thr}$ chosen as $0 < \lambda_{thr} < \lambda_{em}$. In some exemplary embodiments the threshold value $\lambda_{thr}$ may be a fixed value. In other exemplary embodiments, the VCU 110 is configured to dynamically configure the configurable value, suitably based on the current state of one or more vehicle driving parameters, such as current speed of the vehicle. In some exemplary embodiments, the configurable value is obtained from a function of the slip $\lambda_{em}$ of the electric machine 106. In some exemplary embodiments, the configurable value is obtained from a look-up table using the slip $\lambda_{em}$ of the electric machine 106 as index. In some exemplary embodiments, wherein signed wheel slip limit $\lambda_{lim} = \lambda_{em} \lambda_{thr}$, where $\lambda_{thr}$ is a defined threshold value chosen as $0 < \lambda_{thr} < \lambda_{em}$. In some exemplary embodiments, when the vehicle is accelerating, the VCU 110 is configured to control the left wheel 102a and right wheel 102b to rotate at wheel speeds resulting in respective wheel slips $\lambda_l$, $\lambda_r$ which are equal to or larger than zero, but smaller than $2\lambda_{em}$.

The VCU 110 may be configured to request the electric machine 106 to rotate at a rotational machine speed $\omega_{em}$ resulting in a slip $\lambda_{em}$ of the electric machine 106 based on the equation $$\lambda_{em} = \frac{\omega_{em} i_g i_{fd} R - v_x}{\max(|\omega_{em} i_g i_{fd} R|, |v_x|)}$$

where $i_g$ is a gear ratio, $i_{fd}$ is a final drive ratio, R is the wheel radius, $v_x$ is the vehicle velocity.

As previously explained, $\lambda_{em}$ quantifies how much each wheel 102a, 102b is slipping with respect to the road surface if the wheel slips $\lambda_l$, $\lambda_r$ are equally distributed (for instance, if the left and the right wheels 102a, 102b both run on a dry road surface, and the tyres are substantially evenly loaded and in substantially even condition). Thus, in the case of $\lambda_l = \lambda_r$, then $\lambda_{em}$ quantifies how much each wheel 102a, 102b is slipping with respect to the road surface. Therefore, when the VCU 110 requests the electric machine 106 to rotate at a machine speed $\omega_{em}$ resulting in a slip $\lambda_{em}$ of the electric machine 106, it may be regarded as an indirect request for a desired wheel slip. However, as already explained, the actual wheel slips may deviate to some extent from said desired wheel slip. By combining the request for a machine speed in combination with setting a maximum allowable deviation of the wheel slip (i.e. setting $\lambda_{lim}$), a good wheel slip control is achievable, which will now be discussed with reference to the illustrative graphs in FIGS. 3a, 3b, 4a and 4b.

FIGS. 3a and 3b are graphs which schematically illustrate, for a propulsion scenario, the difference in slip when no slip control is performed (FIG. 3a) compared to when slip control is performed in accordance with the present disclosure (FIG. 3b). The VCU 110 has in both graphs requested a slip ($\lambda_{em}$) of 0.1. Thus, the MSD 112 will control the speed of the electric machine 106 so that it reaches the slip target ($\lambda_{em}$) of 0.1.

In FIG. 3a a rather extreme scenario is shown, which however is useful to consider for illustrative and explanatory purposes. In FIG. 3a, the left wheel rotates at constant speed without any slip at all, while the right wheel spins. Accordingly, in FIG. 3a, the wheel slip $\lambda_l$ of the left wheel is zero and the wheel slip of the right wheel $\lambda_r$ is double the slip $\lambda_{em}$ of the electric machine, thus satisfying the equation:

$$\lambda_{em} = \frac{\lambda_l + \lambda_r}{2}$$

FIG. 3b illustrates the corresponding scenario, however, with a split-p compensation providing a slip limit $\lambda_{lim}$ in accordance with this disclosure. In the illustration in FIG. 3b, the slip limit $\lambda_{lim}$ has been set in accordance with the equation $\lambda_{lim} = \lambda_{em} + \lambda_{thr}$, where the threshold value $\lambda_{thr}$ has been chosen to be 0.05. However, as explained above, the threshold value $\lambda_{thr}$ may be selected differently, and even dynamically, and the slip limit $\lambda_{lim}$ may be calculated in other manners and with different equations, as already discussed above.

Similarly to FIG. 3a, in FIG. 3b the wheel slip $\lambda_r$ of the right wheel increases. However, at a certain point in time, just below 2 seconds in the graph, the value of the wheel slip $\lambda_r$ exceeds the set slip limit $\lambda_{lim}$. The MSD 120, having received from the VCU 110 the control signal, will now activate the service brake 112b associated to the right wheel 102b and as a result torque is transferred from the right wheel 102b to the left wheel 102a. This will result in that in the slip control region of the graph, i.e. starting just before the two second mark, the wheel slip $\lambda_l$ of the left wheel will start rising. The above equation will still be accurate, i.e. the sum of the left and right wheel slips $\lambda_l$, $\lambda_r$ equals double the slip $\lambda_{em}$ of the electric machine 106. In this way the VCU 110 may perform efficient slip control by providing a slip request for the electric machine 106 and instructing the MSD 120 to monitor and act on wheel slip input so that the wheel slips do not excessively deviate from the slip request for the electric machine 106 (which as explained above may be regarded as an indirect request for a desired wheel slip).

FIGS. 4a and 4b are graphs which schematically illustrate, for a braking scenario, the difference in slip when no slip control is performed (FIG. 4a) compared to when slip control is performed in accordance with the present disclosure (FIG. 4b). The VCU 110 has as regards the electric machine 106 requested a slip target ($\lambda_{em}$) of −0.1. The MSD 120 reduces the speed of the electric machine 106 to reach a slip ($\lambda_{em}$) of −0.1.

Once again, this is an extreme case shown for illustrative purposes. As can be seen in FIG. 4a, the left wheel does not slow down at all and the wheel slip $\lambda_l$ is zero for the left wheel, whereas the right wheel slows down twice as much as the axle, thus the wheel slip $\lambda_r$ of the right wheel is double the slip $\lambda_{em}$ of the electric machine, both having negative values.

As shown in FIG. 4b, when split-p compensation providing the slip limit $\lambda_{lim}$ according to the present disclosure is applied, the left wheel having its constant zero slip will exceed the slip limit $\lambda_{lim}$ and consequently slip control is performed on this left wheel to transfer torque to the right wheel.

It should be noted that in both FIGS. 3b and 4b a signed maximum slip limit $\lambda_{lim}$ is applied. This might be counterintuitive for the braking scenario and may be incorrectly interpreted as maximum absolute slip limit. This is not the case. A maximum slip limit during braking means a minimum braking or a minimum negative slip, as shown in FIG. 4b. As mentioned previously, in at least some exemplary embodiments, separate signals may be sent from the VCU 110, one for braking and one for propulsion.

It should also be noted that although the VCU 110 requests the electric machine 106 to rotate at a machine speed resulting in a certain slip $\lambda_{em}$ of the electric machine, there may be a delay in fulfilling this request, as illustrated in FIGS. 3a, 3b, 4a and 4b. The actual current slip $\lambda_{em}$ of the electric machine changes until the requested slip (target slip) is reached. The slip limit $\lambda_{lim}$ is of course set in relation to the actual current slip $\lambda_{em}$ of the electric machine, as also illustrated in FIGS. 3a, 3b, 4a and 4b, so that $\lambda_{lim}$ changes over time as $\lambda_{em}$ changes.

Figure 5:
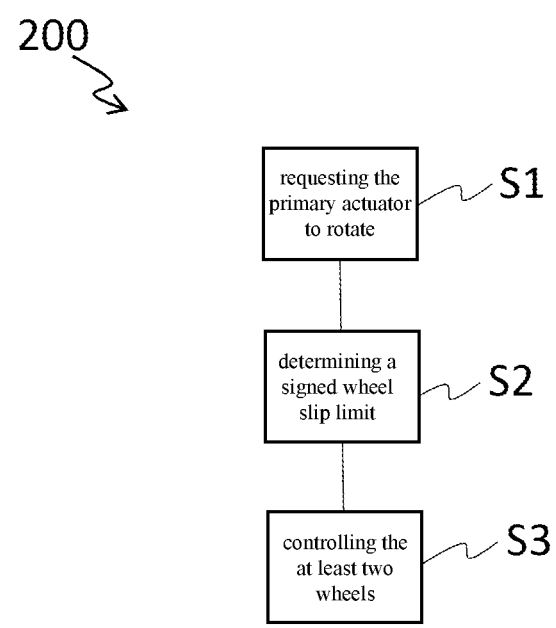
FIG. 5 schematically illustrates a method according to an exemplary embodiment of the invention.

FIG. 5 schematically illustrates a method 200 according to an exemplary embodiment of the invention. More specifically, the method 200 is executed in a vehicle control unit, VCU, for controlling wheel slip of a vehicle, wherein the vehicle comprises at least two wheels (such as left and right wheels) driven by at least one primary actuator (such as an electric machine) via an open differential, the method comprising:

in a step S1, requesting the primary actuator to rotate at a machine speed resulting in a slip $\lambda_{em}$ of the primary actuator, in a step S2, determining a signed wheel slip limit $\lambda_{lim}$ by adding a configurable value to the slip $\lambda_{em}$ of the primary actuator, such that $\lambda_{lim} > \lambda_{em}$, and in a step S3, controlling the at least two wheels of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values.

It should be understood that the above presented steps may be performed in a different order than the sequence presented above. For instance, the signed wheel slip limit $\lambda_{lim}$ may be determined (step S2) in advance, before the requesting step (step S1). This may, for example, be done by setting the signed wheel slip limit $\lambda_{lim}$ as a function of, or in relation, to an actual slip $\lambda_{em}$ of the electric machine. For instance, as show in FIGS. 3a, 3b, 4a and 4b the signed slip limit $\lambda_{lim}$ may be set as $\lambda_{lim} = \lambda_{em} + \lambda_{thr}$, in which the threshold value $\lambda_{thr}$ is determined in advance (in the exemplary graphs in said drawing figures $\lambda_{thr} = 0.5$). Furthermore, it should be understood that it is even conceivable to execute steps S1 and S2 simultaneously.

Figure 6:
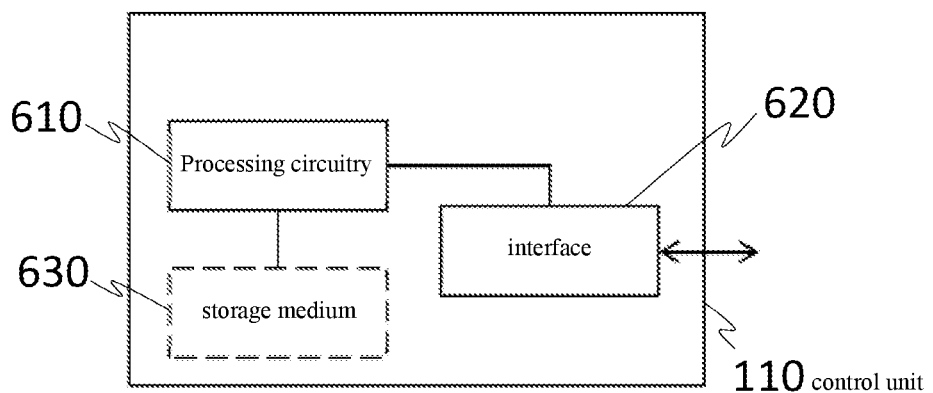
FIG. 6 schematically illustrates a control unit according to at least one exemplary embodiment of the invention.

FIG. 6 schematically illustrates a control unit 110 according to at least one exemplary embodiment of the invention. In particular, FIG. 6 illustrates, in terms of a number of functional units, the components of a control unit 110 according to exemplary embodiments of the discussions herein. The control unit 110 may be comprised in the vehicle 100, e.g. in the form of a VCU. Processing circuitry 610 may be provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 may further be provided as at least one application specific integrated circuit ASIC, or field programmable gate array FPGA.

Particularly, the processing circuitry 610 is configured to cause the control unit 110 to perform a set of operations, or steps, such as the method discussed in connection to FIG. 5. For example, the storage medium 630 may store the set of operations, and the processing circuitry 610 may be configured to retrieve the set of operations from the storage medium 630 to cause the control unit 110 to perform the set of operations. The set of operations may be provided as a set of executable instructions. Thus, the processing circuitry 610 is thereby arranged to execute exemplary methods as herein disclosed.

The storage medium 630 may also comprise persistent storage, which, for example may be any single one or combination of magnetic memory, optical memory, solid state memory or even remotely mounted memory.

The control unit may 110 further comprise an interface 620 for communications with at least one external device such as a sensor providing vehicle speed input, for GPS communication, etc. As such, the interface 620 may comprise one or more transmitters and receivers, comprising analogue and digital components and a suitable number of ports for wireline or wireless communication.

The processing circuitry 610 controls the general operation of the control unit 110, e.g. by sending data and control signals to the interface 620 and the storage medium 630, by receiving data and reports from the interface 620, and by retrieving data and instructions form the storage medium 630. Other components, as well as the related functionality, of the control unit 110 are omitted in order not to obscure the concepts presented herein.

Figure 7:
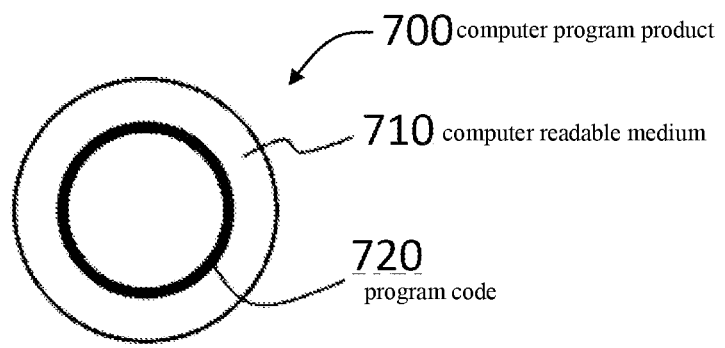
FIG. 7 schematically illustrates a computer program product according to at least one exemplary embodiment of the invention.

FIG. 7 schematically illustrates a computer program product 700 according to at least one exemplary embodiment of the invention. More specifically, FIG. 7 illustrates a computer readable medium 710 carrying a computer program comprising program code means 720 for performing the methods exemplified in FIG. 5, when said program product is run on a computer. The computer readable medium 710 and the program code means 720 may together form the computer program product 700.

The invention claimed is:

1. A system for controlling wheel slip of a vehicle, wherein the vehicle comprises at least two wheels driven by at least one primary actuator via an open differential, and individual secondary actuators for providing additional force to individual wheels, respectively, the system comprising a vehicle control unit ("VCU") and a motion support device, (MSD), wherein the VCU is configured to:

request the primary actuator to rotate at a speed resulting in a slip $\lambda_{em}$ of the primary actuator, determine a signed wheel slip limit $\lambda_{lim}$ by adding a configurable value to the slip $\lambda_{em}$ of the primary actuator, such that $\lambda_{lim} > \lambda_{em}$, and send a control signal to the MSD for controlling said at least two wheels of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values, wherein the MSD, is configured to:

receive said control signal from the VCU, calculate a current respective wheel slip $\lambda_l$, $\lambda_r$ of each one of said at least two wheels or a current respective rotational speed which is transformable into said respective wheel slip $\lambda_l$, $\lambda_r$, and based on the received control signal, when one of the current respective wheel slips $\lambda_l$, $\lambda_r$ exceeds the signed wheel slip limit $\lambda_{lim}$, then the MSD is configured to activate the respective secondary actuator to the wheel having the exceeding wheel slip in order to transfer torque to the other wheel(s).

2. The system according to claim 1, wherein the configurable value is a threshold value $\lambda_{thr}$ chosen as $0 < \lambda_{thr} < \lambda_{em}$.

3. The system according to claim 2, wherein the threshold value $\lambda_{thr}$ is a fixed value.

4. The system according to claim 1, wherein the VCU is configured to dynamically configure the configurable value based on a current state of one or more vehicle driving parameters.

5. The system according to claim 1, wherein the configurable value is obtained from a function of the slip $\lambda_{em}$ of the primary actuator.

6. The system according to claim 1, wherein the configurable value is obtained from a look-up table using the slip $\lambda_{em}$ of the primary actuator as index.

7. The system according to claim 1, wherein the signed wheel slip limit $\lambda_{lim} = \lambda_{em} + \lambda_{thr}$, where $\lambda_{thr}$ is a defined threshold value chosen as $0 < \lambda_{thr} < \lambda_{em}$.

8. The system according to claim 1, wherein when the vehicle is accelerating or decelerating, the VCU is configured to control the at least two wheels to rotate at wheel speeds resulting in respective wheel slips $\lambda_l$, $\lambda_r$ which are equal to or larger than zero, but smaller than $2\lambda_{em}$.

9. The system according to claim 1, wherein the VCU is configured to request the primary actuator to rotate at a rotational speed $\omega_{em}$ resulting in a slip $\lambda_{em}$ of the primary actuator based on the equation $$\lambda_{em} = \frac{\omega_{em} i_g i_{fd} R - v_x}{\max(|\omega_{em} i_g i_{fd} R|, |v_x|)}$$

where $i_g$ is a gear ratio, $i_{fd}$ is a final drive ratio, R is a wheel radius, $v_x$ is a vehicle velocity.

10. The system according to claim 1, wherein said primary actuator is an electric machine, and/or wherein said secondary actuators are service brakes for providing friction force to the respective wheels.

11. A method executed in a vehicle control unit, VCU, for controlling wheel slip of a vehicle, wherein the vehicle comprises at least two wheels driven by at least one primary actuator via an open differential, the method comprising:
   requesting the primary actuator to rotate at a speed resulting in a slip $\lambda_{em}$ of the primary actuator,
   determining a signed wheel slip limit $\lambda_{lim}$ by adding a configurable value to the slip $\lambda_{em}$ of the primary actuator, such that $\lambda_{lim} > \lambda_{em}$, and
   controlling said at least two wheels of the vehicle to rotate at wheel speeds resulting in respective wheel slips $\lambda_l$, $\lambda_r$ below the signed wheel slip limit $\lambda_{lim}$, wherein each one of $\lambda_l$, $\lambda_r$ and $\lambda_{em}$ are signed numerical values.

12. The method according to claim 11, wherein the configurable value is a threshold value $\lambda_{thr}$ chosen as $0 < \lambda_{thr} < \lambda_{em}$.

13. The method according to of claim 12, wherein the threshold value $\lambda_{thr}$ is a fixed value.

14. The method according to claim 11, comprising dynamically configuring the configurable value, suitably based on the current state of one or more vehicle driving parameters.

15. The method according to claim 11, wherein the configurable value is obtained from a function of the slip $\lambda_{em}$ of the primary actuator.

16. The method according to claim 11, wherein the configurable value is obtained from a look-up table using the slip $\lambda_{em}$ of the primary actuator as index.

17. The method according to claim 11, wherein the signed wheel slip limit $\lambda_{lim} = \lambda_{em} + \lambda_{thr}$, where $\lambda_{thr}$ is a defined threshold value chosen as $0 < \lambda_{thr} < \lambda_{em}$.

18. The method according to claim 11, further comprising:
   controlling, when the vehicle is accelerating or decelerating, the at least two wheels to rotate at wheel speeds resulting in respective wheel slips $\lambda_l$, $\lambda_r$ which are equal to or larger than zero, but smaller than $2\lambda_{em}$.

19. The method according to claim 11, further comprising:
   controlling the primary actuator to rotate at a rotational speed $\omega_{em}$ resulting in a slip $\lambda_{em}$ of the primary actuator based the equation $$\lambda_{em} = \frac{\omega_{em} i_g i_{fd} R - v_x}{\max(|\omega_{em} i_g i_{fd} R|, |v_x|)}$$

where $i_g$ is a gear ratio, $i_{fd}$ is a final drive ratio, R is the wheel radius, $v_x$ is the vehicle velocity.

20. The method according to claim 11, wherein said primary actuator is an electric machine.

21. A non-transitory computer readable medium carrying a computer program comprising program code for performing the steps of claim 11 when said program code is run on a computer or on processing circuitry of a vehicle control unit, VCU.

22. A vehicle control unit for controlling wheel slip of a vehicle, the control unit being configured to perform the method according to claim 11.

23. A vehicle comprising a system according to claim 1.

* * * * *